United States Patent
Hallstadius et al.

(10) Patent No.: US 8,320,515 B2
(45) Date of Patent: Nov. 27, 2012

(54) WATER REACTOR FUEL CLADDING TUBE

(75) Inventors: Lars Hallstadius, Vasteras (SE); Mats Dahlback, Vasteras (SE)

(73) Assignee: Westinghouse Electric Sweden AB, Vasteras (SE)

( * ) Notice: Subject to any disclaimer, the term of this patent is extended or adjusted under 35 U.S.C. 154(b) by 280 days.

(21) Appl. No.: 12/438,555

(22) PCT Filed: Aug. 13, 2007

(86) PCT No.: PCT/SE2007/050544
§ 371 (c)(1),
(2), (4) Date: Apr. 3, 2009

(87) PCT Pub. No.: WO2008/024059
PCT Pub. Date: Feb. 28, 2008

(65) Prior Publication Data
US 2011/0002433 A1 Jan. 6, 2011

(30) Foreign Application Priority Data
Aug. 24, 2006 (SE) ........................ 0601733

(51) Int. Cl.
*G21C 3/00* (2006.01)
(52) U.S. Cl. ...................... 376/416; 376/409
(58) Field of Classification Search ................ 376/416, 376/409, 417, 412, 457
See application file for complete search history.

(56) References Cited

U.S. PATENT DOCUMENTS

| | | | |
|---|---|---|---|
| 854,096 A | 5/1907 | Levering | |
| 3,620,691 A | 11/1971 | Rubel | |
| 4,200,492 A | 4/1980 | Armijo et al. | |
| 4,372,817 A | 2/1983 | Armijo et al. | |
| 4,584,030 A * | 4/1986 | McDonald et al. | 148/281 |
| 4,610,842 A | 9/1986 | Vannesjo | |
| 4,649,023 A | 3/1987 | Sabol et al. | |
| 4,664,881 A | 5/1987 | Ferrari et al. | |
| 4,675,153 A | 6/1987 | Boyle et al. | |

(Continued)

FOREIGN PATENT DOCUMENTS

CA 1126396 9/1968

(Continued)

OTHER PUBLICATIONS

M. Dahlback et al.; *The Effect of Liner Component Iron Content on Cladding Corrosion, Hydriding, and PCI Resistance*; Journal of ASTM International; Oct. 2005; vol. 2, No. 9; Paper ID JAI12444 Available online @ www.astm.org.

(Continued)

*Primary Examiner* — Ricardo Palabrica

(74) *Attorney, Agent, or Firm* — Alston & Bird LLP

(57) ABSTRACT

A water reactor fuel cladding tube (4) is described. The tube (4) comprises an outer layer (6) of a first zirconium based alloy and has metallurgically bonded thereto an inner layer (7) of a second zirconium based alloy. The inner layer protects (7) the cladding tube (4) against stress corrosion cracking. The second zirconium based alloy comprises tin as an alloying material, and each one of the zirconium based alloys comprises at least 96 percent by weight zirconium. The first zirconium based alloy comprises at least 0.1 percent by weight niobium. A method of manufacturing the cladding tube (4) is also described and comprises the step of co-extruding two tubes of different zirconium based alloys to produce the cladding tube (4).

11 Claims, 2 Drawing Sheets

U.S. PATENT DOCUMENTS

| | | | |
|---|---|---|---|
| 4,707,330 A | 11/1987 | Ferrari | |
| 4,735,768 A | 4/1988 | Stehle et al. | |
| 4,751,045 A | 6/1988 | Foster et al. | |
| 4,775,508 A | 10/1988 | Sabol et al. | |
| 4,778,648 A * | 10/1988 | Ferrari | 376/457 |
| 4,810,461 A | 3/1989 | Inagaki et al. | |
| 4,879,093 A | 11/1989 | Garde | |
| 4,894,203 A | 1/1990 | Adamson | |
| 4,933,136 A | 6/1990 | Foster et al. | |
| 4,938,920 A | 7/1990 | Garzarolli et al. | |
| 4,963,316 A | 10/1990 | Stehle et al. | |
| 4,963,323 A | 10/1990 | Matsuo et al. | |
| 4,986,957 A | 1/1991 | Taylor | |
| 4,992,240 A | 2/1991 | Komatsu et al. | |
| 5,023,048 A | 6/1991 | Mardon et al. | |
| 5,024,426 A | 6/1991 | Busch et al. | |
| 5,024,809 A | 6/1991 | Taylor | |
| 5,026,516 A | 6/1991 | Taylor | |
| 5,073,336 A | 12/1991 | Taylor | |
| 5,080,861 A | 1/1992 | Garde | |
| 5,125,985 A | 6/1992 | Foster et al. | |
| 5,211,774 A | 5/1993 | Garde et al. | |
| 5,223,211 A | 6/1993 | Inagaki et al. | |
| 5,225,154 A | 7/1993 | Kanno et al. | |
| 5,244,514 A | 9/1993 | Garde | |
| 5,266,131 A * | 11/1993 | Foster et al. | 148/672 |
| 5,278,882 A | 1/1994 | Garde et al. | |
| 5,341,407 A | 8/1994 | Rosenbaum et al. | |
| 5,361,282 A | 11/1994 | Adamson et al. | |
| 5,373,541 A | 12/1994 | Mardon et al. | |
| 5,383,228 A * | 1/1995 | Armijo et al. | 376/409 |
| 5,417,780 A | 5/1995 | Adamson et al. | |
| 5,437,747 A * | 8/1995 | Adamson et al. | 148/519 |
| 5,493,592 A | 2/1996 | Garzarolli et al. | |
| 5,517,541 A | 5/1996 | Rosenbaum et al. | |
| 5,524,032 A * | 6/1996 | Adamson et al. | 376/409 |
| 5,560,790 A | 10/1996 | Nikulina et al. | |
| 5,578,145 A | 11/1996 | Adamson et al. | |
| 5,620,536 A | 4/1997 | Dahlback | |
| 5,622,574 A | 4/1997 | Charquet | |
| 5,654,993 A | 8/1997 | Vesterlund et al. | |
| 5,711,826 A | 1/1998 | Nordstrom | |
| 5,790,623 A | 8/1998 | Van Swam | |
| 5,805,656 A | 9/1998 | Adamson | |
| 5,832,050 A | 11/1998 | Rebeyrolle et al. | |
| 5,838,753 A | 11/1998 | Van Swam et al. | |
| 5,844,959 A | 12/1998 | Van Swam et al. | |
| 5,862,194 A | 1/1999 | Fujieda et al. | |
| 5,901,193 A | 5/1999 | Dahlback et al. | |
| 2001/0019597 A1 | 9/2001 | Rudling et al. | |
| 2008/0080660 A1 | 4/2008 | Barberis et al. | |

FOREIGN PATENT DOCUMENTS

| | | |
|---|---|---|
| CN | 1818111 A | 8/2006 |
| DE | 198 44 759 | 4/2000 |
| DE | 199 42 463 | 5/2001 |
| EP | 0 198 570 | 8/1980 |
| EP | 0 155 168 | 9/1985 |
| EP | 0 194 797 | 9/1986 |
| EP | 0 380 381 A1 | 8/1990 |
| EP | 0 533 073 | 3/1993 |
| EP | 0 552 098 A1 | 7/1993 |
| EP | 0 712 643 A1 | 5/1996 |
| EP | 0 964 406 | 12/1999 |
| EP | 1 688 508 A1 | 9/2006 |
| FR | 2 723 080 A1 | 2/1996 |
| FR | 2 874 119 A1 | 2/2006 |
| JP | 64 39589 | 2/1989 |
| JP | 3-48193 | 3/1991 |
| JP | 07-077590 | 3/1995 |
| JP | 08-068884 | 3/1996 |
| RU | 2 189 652 C1 | 9/2002 |
| RU | 2 271 586 C2 | 9/2005 |
| RU | 009703 B1 | 6/2007 |
| SE | 422380 | 3/1982 |
| SE | 441714 | 10/1985 |
| SE | 469997 | 10/1993 |
| WO | WO 01/61062 | 8/2001 |
| WO | WO 03/104510 | 12/2003 |

OTHER PUBLICATIONS

The International Search Report for PCT Application No. PCT/SE2007/050544; Filed Aug. 13, 2007; Date of Completion Nov. 27, 2007; Date of Mailing Nov. 29, 2007.
The International Preliminary Report on Patentability for PCT Application No. PCT/SE2007/050544; Filed Aug. 13, 2007.
The Response to Written Opinion Dated Jan. 31, 2008.
Samoilov, A.G., et al.; "Dispersion Fuel Elements. Materials and Technologies"; Moscow; Energoizdat; 1982; vol. 1, p. 198 (2 pages).
Extended Search Report from European Patent Application No. 07794154.0, dated Apr. 24, 2012.
Nikiforov, A. S. et al., *Liquid Radioactive Waste Neutralization*, Moscow, 'Energoatomizdat' Publisher, (1985) 115.

* cited by examiner

WATER REACTOR FUEL CLADDING TUBE

TECHNICAL FIELD

The present invention relates to a water reactor fuel cladding tube comprising an inner layer and an outer layer of a first zirconium based alloy and a second zirconium based alloy, respectively. The present invention also relates to a fuel rod and a fuel assembly comprising such a water reactor fuel cladding tube and a method of manufacturing such a water reactor fuel cladding tube.

DESCRIPTION OF THE PRIOR ART

Fuel cladding tubes for water reactors have usually been manufactured of a zirconium based alloy. Examples of alloys that have been used are Zircaloy-2 and Zircaloy-4. Fuel rods are formed by inserting fuel pellets into the cladding tubes. Fuel assemblies comprise a number of fuel rods.

A problem that has been observed when using zirconium based alloy cladding tubes in a reactor is that cracks may be formed which emanate from the interior surface of the cladding tube as is described in EP 0194797. The cracks are believed to be created by the contact between the cladding tube and the fuel pellets during rapid increases in the power output from the reactor, the so called Pellet Cladding Interaction (PCI). EP 0194797 presents a solution to this problem by providing a protective inner layer of a zirconium based alloy.

In pressurized water reactors (PWR) the power output from the reactor does not increase as rapidly as in boiling water reactors (BWR) and therefore the formation of cracks is not so common in PWR as in BWR. Thus, a protective inner layer has not been considered to be as important in PWR as in BWR.

It has, however, been found that there still exists a problem with cracks in the cladding tubes of pressurized water reactors due to Pellet Cladding Interaction (PCI)0.

SUMMARY OF THE INVENTION

An object of the present invention is to provide a water reactor fuel cladding tube which has favourable properties in respect of resistance to corrosion. Especially, it is aimed at such a corrosion-resistant water reactor fuel cladding tube for a pressurized water reactor.

Another object of the present invention is to provide a method of manufacturing a water reactor fuel cladding tube which cladding tube has favourable properties in respect of resistance to corrosion. Especially, it is aimed at a method of manufacturing such a corrosion-resistant water reactor fuel cladding tube for a pressurized water reactor.

These objects are achieved with a water reactor fuel cladding tube and a method according to the independent claims.

Further advantages with the present invention are achieved with the features defined in the dependent claims.

According to a first aspect of the present invention a water reactor fuel cladding tube is provided. The water reactor fuel cladding tube comprises an outer layer of a first zirconium based alloy and having metallurgically bonded thereto an inner layer of a second zirconium based alloy, which inner layer is adapted to protect the cladding tube against stress corrosion cracking. The second zirconium based alloy comprises tin as an alloying material and each one of the zirconium based alloys comprises at least 96 percent by weight zirconium. The water reactor fuel cladding tube is characterized in that the first zirconium based alloy comprises at least 0.1 percent by weight niobium.

By having a niobium containing alloy in the outer layer the water reactor fuel cladding tube becomes more corrosion resistant in a pressurised water reactor than if the outer layer would be a zirconium based alloy without niobium. Furthermore, the addition of an inner layer of a zirconium based alloy containing tin as an alloying material resistance of the water reactor fuel cladding tube against crack formation is improved compared with water reactor fuel cladding tubes without any layer of a zirconium based alloy comprising tin.

The main alloying materials of the first zirconium based alloy may be niobium, iron and tin, wherein the content of any additional substances is below 0.05 percent by weight. Such an alloy provides favourable characteristics regarding corrosion, especially in a pressurised water reactor.

The main alloying materials of the first zirconium based alloy may comprise chromium. In case zirconium is present in the first zirconium based alloy the content of chromium is preferably 0.05-0.1 percent by weight.

The first zirconium based alloy may comprise oxygen. In case oxygen is present in the first zirconium based alloy the content of oxygen is preferably 500-2000 ppm by weight.

According to an embodiment of the present invention the first zirconium based alloy may comprise 0.6-1.2 percent by weight niobium and preferably 1.0-1.1 percent by weight niobium and most preferred 1.02-1.04 percent by weight niobium. Further, the first zirconium based alloy comprises 0.6-1.2 percent by weight tin and preferably 0.6-1.0 percent by weight tin and most preferred 0.6-0.8 percent by weight tin. Furthermore, the first zirconium based alloy comprises 0.1-0.3 percent by weight iron. Such an alloy is usually called Zirlo and may also include chromium and oxygen in the amounts specified in the preceding two paragraphs. Zirlo has proved to be a favourable alloy in pressurised water reactors. It is also possible to use an alloy with only one or a few of the alloying materials mentioned above.

As an alternative to the above described embodiments the main alloying material of the first zirconium based alloy is niobium, and the content of any additional substances is below 0.05 percent by weight. The first zirconium based alloy preferably comprises 0.6-1.2 percent by weight niobium.

The first zirconium based alloy may alternatively comprise the alloying materials as defined in any one of claims 12-31. These alloy provide a high resistance against corrosion.

According to an embodiment of the present invention the main alloying materials of the second zirconium based alloy are tin and iron, wherein the content of any additional substances is below 0.05 percent by weight. The second zirconium based alloy favourably comprises 0.1-1 percent by weight tin. Such an alloy is favourable in that it is soft enough to hinder the formation of contact induced cracks in the water reactor fuel cladding tube.

In order to provide optimum characteristics, regarding contact induced cracks, the second zirconium based alloy comprises 0.02-0.3 percent by weight iron.

A water reactor fuel cladding tube according to any one of the preceding claims, wherein the outer layer is partially re-crystallized.

In order to provide optimum resistance against cracks in the water reactor fuel cladding tube the inner layer is preferably fully re-crystallized.

In order to provide optimum corrosion resistance of the outer layer the outer layer is preferably partially re-crystallized.

In case the outer layer of the water reactor fuel cladding tube is partially re-crystallized the degree of re-crystallization in the outer layer is 45 percent-90 percent and preferably 50 percent-70 percent.

A water reactor fuel cladding tube according to the invention may be manufactured in many ways. According to an embodiment of the present invention the water reactor fuel cladding tube has been manufactured by co-extrusion of a first tube of the first zirconium based alloy and a second tube of the second zirconium based alloy. This method provides the possibility of manufacturing a tube of high quality.

The thickness of the inner layer in a water reactor fuel cladding tube according to the invention is 5-40% of the thickness of the reactor fuel cladding tube and preferably 5-15% of the thickness of the reactor fuel cladding tube. This provides for good protection against crack formation while keeping the weight of the water reactor fuel cladding tube down.

According to a second aspect of the present invention a water reactor fuel rod is provided which comprises a water reactor fuel cladding tube according to the invention and fuel pellets enclosed by the water reactor fuel cladding tube.

According to a third aspect of the present invention a water reactor fuel assembly is provided which comprises at least two fuel rods according to the invention.

According to a fourth aspect of the present invention a method of manufacturing a water reactor fuel cladding tube is provided. The method comprises the steps of providing a first tube of a first zirconium based alloy having an inner diameter and an outer diameter, providing a second tube of a second zirconium based alloy having an inner diameter and an outer diameter, wherein the outer diameter of the second tube is essentially equal to the inner diameter of the first tube, inserting the second tube into the first tube, and co-extruding the first tube and the second tube to form the water reactor fuel cladding tube. Each one of the zirconium based alloys comprises at least 96 percent by weight zirconium. The method is characterized in that the first zirconium based alloy comprises at least 0.1 percent by weight niobium.

In the manufactured water reactor fuel cladding tube the outer layer corresponds to the first tube and the inner layer corresponds to the second tube.

It is known in the art to manufacture cladding tubes by inserting a first tube inside a second tube before co-extruding the tubes. Before insertion of the first tube inside the second tube the inside of the second tube is usually etched in order to produce a smooth surface on the inside the second tube and to make the inner diameter of the second tube essentially equal to the outer diameter of the first tube. When the tube comprises a niobium containing zirconium based alloy it is, however, unfavourable to etch the surface of the tube as the etching process will leave residual products in the form of pure niobium on the surface of the tube.

According to an embodiment of the present invention the inner surface of the first tube is mechanically machined so that the inner diameter of the first tube essentially corresponds to the outer diameter of the second tube, before the second tube is inserted into the first tube.

The method may also include the step of heat treating the water reactor fuel cladding tube so that the inner layer is fully re-crystallized and so that the outer layer is partially re-crystallized.

According to an embodiment of the present invention the heat treatment is performed until the degree of re-crystallisation of the outer layer is 45 percent-90 percent and preferably until the degree of re-crystallisation of the outer layer is 50 percent-70 percent. This has proved to be a favorable degree of re-crystallisation.

According to an embodiment of the present invention the heat treatment is performed at a temperature of 485-565° C. during 1-6 hours.

This provides the desired degrees of re-crystallisation mentioned above. A man skilled in the art will easily find the exact temperature and time to achieve a desired degree of re-crystallisation of the outer layer, within the above mentioned interval for the degree of re-crystallisation.

In the following preferred embodiments of the invention will be described with reference to the appended drawings.

SHORT DESCRIPTION OF THE DRAWINGS

DESCRIPTION OF PREFERRED EMBODIMENTS

Figure 1:
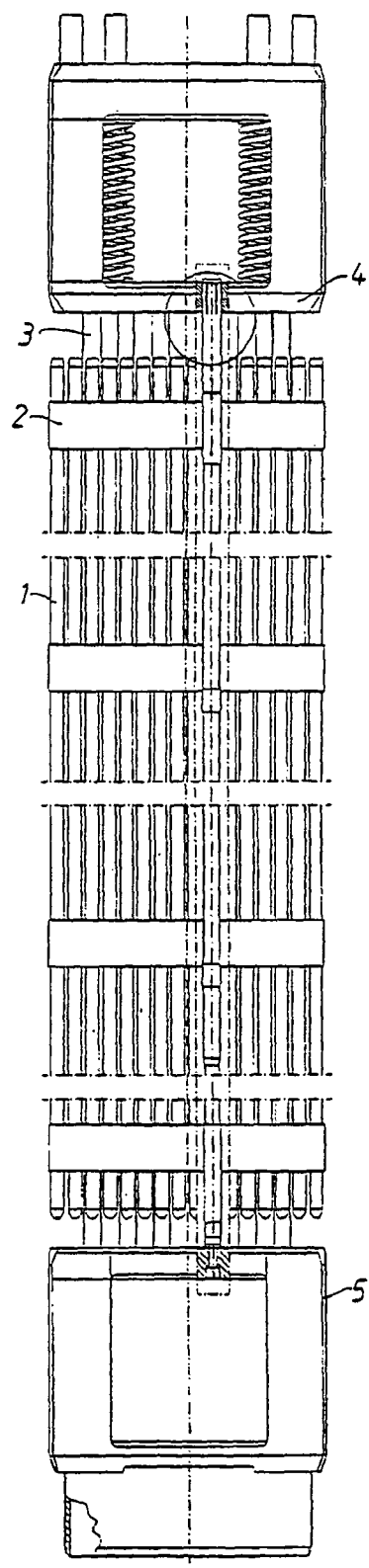
FIG. 1 shows schematically a fuel assembly, known per se, for a PWR.

In the following description of preferred embodiments of the invention the same reference numeral will be used for similar features in the different drawings, which are not drawn to scale.

FIG. 1 shows schematically a fuel assembly, known per se, for a PWR. The fuel assembly comprises a top plate 4 and a bottom plate 5. Between the top plate 4 and the bottom plate 5 a plurality of guide tubes 3 for control rods extend. Furthermore, the fuel assembly comprises a plurality of cladding tubes 1. These cladding tubes 1 thus contain a nuclear fuel material and are thereby called fuel rods. In this kind of fuel assembly for PWR, the fuel rods do not reach all the way to the top plate 4 and to the bottom plate 5. The fuel rods are kept in position in the fuel assembly with the help of spacers 2.

Figure 2:
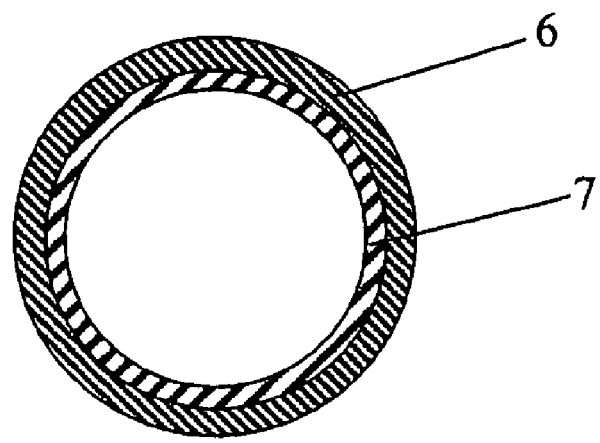
FIG. 2 shows in cross-section a water reactor fuel cladding tube according to an embodiment of the present invention.

FIG. 2 shows in cross-section a water reactor fuel cladding tube 4 according to an embodiment of the present invention. The fuel cladding tube comprises an outer layer 6 and an inner layer 7. The outer layer 6 is of a first zirconium based alloy while the inner layer 7 is of a second zirconium based alloy.

The first zirconium based alloy comprises niobium. An example of the first zirconium based alloy comprises 0.6-1.2 percent by weight niobium, a 0.6-1.2 percent by weight tin and 0.1-0.3 percent by weight iron, wherein the content of any additional substances is below 0.05 percent by weight. The first zirconium based alloy may also have a chromium content of 0.05-0.1 percent by weight and an oxygen content of 500-2000 ppm. An alloy including the above substances is sometimes referred to as Zirlo.

A second example of the first zirconium based alloy have a niobium content of 0.6-1.2 percent by weight, wherein the content of any additional substances is below 0.05 percent by weight.

A third example of the first zirconium based alloy comprises 0.6-1.5 percent by weight niobium, 0.05-0.40 percent by weight tin, 0.02-0.30 percent by weight copper, 0.10-0.30 percent by weight vanadium and optionally also 0.01-0.1 percent by weight iron. The total content of additional substances is no more than 0.50 percent by weight and preferably no more than 0.30 percent by weight. With additional substances is meant substances in addition to the main alloying materials.

A fourth example of the first zirconium based alloy comprises 0.6-1.5 by weight niobium, 0.02-0.30 percent by weight copper, 0.15-0.35 percent by weight chromium and optionally also 0.01-0.1 percent by weight iron. The total content of additional substances is no more than 0.50 percent by weight and preferably no more than 0.30 percent by weight.

A fifth example of the first zirconium based alloy comprises 0.2-1.5 percent by weight niobium, 0.05-0.40 percent by weight tin, 0.25-0.45 percent by weight iron, 0.15-0.35 percent by weight chromium and optionally also 0.01-0.1 percent by weight nickel. The total content of additional substances is no more than 0.50 percent by weight and preferably no more than 0.30 percent by weight.

A first example of the second zirconium based alloy comprises 0.1-1 percent by weight tin, wherein the content of any additional substances is below 0.05 percent by weight.

A second example of the second zirconium based alloy comprises 0.1-1 percent by weight tin and 0.02-0.3 percent by weight iron, wherein the content of any additional substances is below 0.05 percent by weight.

Methods for manufacturing tubes of the first zirconium based alloy as well as of the second zirconium based alloy are well known in the art and will not be described herein.

Figure 3:
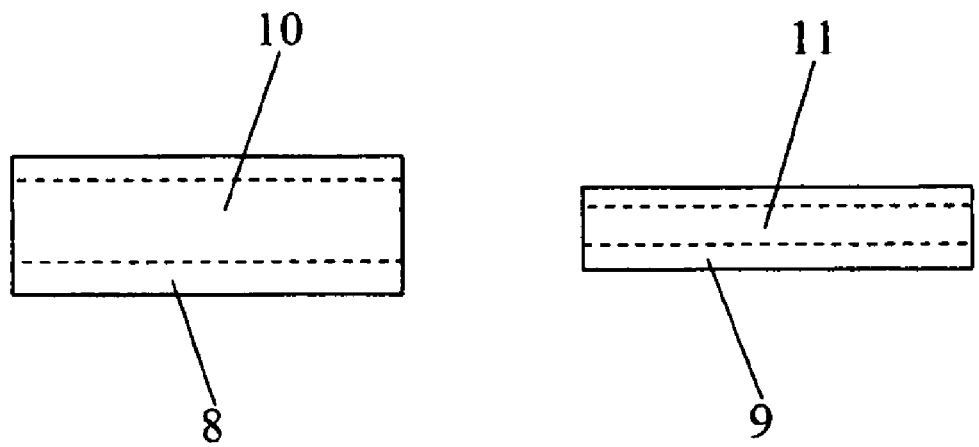
FIG. 3 shows a first tube and a second tube to illustrate a method for manufacturing the fuel cladding tube shown in FIG. 2.

FIG. 3 shows a first tube and a second tube to illustrate a method for manufacturing the fuel cladding tube shown in FIG. 2. A first tube 8 of the first zirconium based alloy and a second tube 9 of the second zirconium based alloy are provided. The first tube 8 defines a first hole 10 and the second tube 9 defines a second hole 11. The first tube as well as the second tube has an inside diameter and an outside diameter. The inside of the first tube 8 and/or the outside of the second tube 9 is mechanically machined until the inner diameter of the first tube 8 is essentially equal to the outer diameter of the second tube 9. The second tube 9 is then inserted into the first tube 8. The assembly of the first tube 8 and the second tube 9 is then co-extruded into the water reactor fuel cladding tube 4 shown in FIG. 2, wherein the outer layer 6 corresponds to the first tube 8 and the inner layer 7 corresponds to the second tube 9. In the co-extrusion the outer layer 6 and the inner layer 7 are metallurgically bonded to each other. As co-extrusion is known to men skilled in the art it will not be described in detail herein.

A further improvement of the corrosion resistance of the inner layer 7 can be obtained by introducing additional heat treatment of the second tube 9 before it is joined to the first tube 8. This additional heat treatment is carried out in the alpha-phase range at 600° C.-800° C. when the second zirconium based alloy does not comprise tin and at 600° C.-860° C. when the second zirconium based alloy comprises tin. Preferably, the heat treatment is carried out at 650° C.-750° C. This extra heat treatment can be carried out as a last step before the second tube 9 is joined to the first tube 8 or earlier in the process chain, for example before the second tube 9 is extruded.

After the co-extrusion, during which the water reactor fuel cladding tube 4 has been formed, the water reactor fuel cladding tube is heat treated in 485° C.-565° C. during 1-6 hours until the inner layer 7 is fully crystallized and the degree of re-crystallisation of the outer layer is 40-50 percent.

The described embodiments may be amended in many ways without departing from the spirit and scope of the present invention which is only limited by the claims.

It is possible within the scope of the invention to have low concentrations of substances other than the ones described above.

The water reactor fuel cladding tube according to the invention may be used in boiler water reactors as well as in pressurised water reactors.

The invention claimed is:

1. A water reactor fuel cladding tube for a pressurized water reactor, said cladding tube comprising an outer layer of a first zirconium based alloy and having directly metallurgically bonded thereto an inner layer of a second zirconium based alloy, wherein the cladding tube does not have any further zirconium based alloy layer, wherein the inner layer is adapted to protect the cladding tube against stress corrosion cracking, wherein the second zirconium based alloy comprises tin as an alloying material, and wherein each one of the zirconium based alloys comprises at least 96 percent by weight zirconium, wherein the main alloying materials of the first zirconium based alloy are niobium, iron and tin with the content of any additional substances being below 0.05 percent by weight, wherein the first zirconium based alloy comprises oxygen;

the first zirconium based alloy comprising 0.6-1.2 percent by weight niobium, 0.6-1.2 percent by weight tin, and 0.1-0.3 percent by weight iron;

wherein the main alloying materials of the second zirconium based alloy are tin and iron and wherein the content of any additional substances is below 0.05 percent by weight, and wherein the second zirconium based alloy comprises 0.1-1 percent by weight tin and 0.02-0.3 percent by weight iron; and wherein the thickness of the inner layer is 5-40% of the thickness of the reactor fuel cladding tube.

2. A water reactor fuel cladding tube according to claim 1, wherein the first zirconium based alloy comprises 500-2000 ppm by weight oxygen.

3. A water reactor fuel cladding tube according to claim 1, wherein the inner layer is partially re-crystallized.

4. A water reactor fuel cladding tube according to claim 1, wherein the inner layer is fully re-crystallized.

5. A water reactor fuel cladding tube according to claim 1, wherein the outer layer is partially re-crystallized.

6. A water reactor fuel cladding tube according to claim 5, wherein the degree of re-crystallization in the outer layer is 45 percent –90 percent.

7. A water reactor fuel cladding tube according to claim 6, wherein the degree of re-crystallisation in the outer layer is 50 percent –70 percent.

8. A water reactor fuel cladding tube according to claim 1, which has been manufactured by co-extrusion of a first tube of the first zirconium based alloy and a second tube of the second zirconium based alloy.

9. A water reactor fuel cladding tube according to claim 1, wherein the thickness of the inner layer is 5-15% of the thickness of the reactor fuel cladding tube.

10. A water reactor fuel rod comprising a water reactor fuel cladding tube according to claim 1 and fuel pellets enclosed by the water reactor fuel cladding tube.

11. A water reactor fuel assembly comprising at least two fuel rods according to claim 10.

* * * * *